United States Patent [19]

Dvorsky

[11] Patent Number: 5,045,741
[45] Date of Patent: Sep. 3, 1991

[54] DUAL-MOTION APPARATUS

[75] Inventor: James E. Dvorsky, Hilliard, Ohio

[73] Assignee: Battelle Memorial Institute, Columbus, Ohio

[21] Appl. No.: 483,685

[22] Filed: Feb. 23, 1990

[51] Int. Cl.$^5$ .................. H02K 19/02; H02K 23/44; H02K 7/06; H02K 13/12

[52] U.S. Cl. .................................. 310/209; 310/80; 310/148; 310/149

[58] Field of Search .......... 310/80, 191, 209, 148-151; 318/135, 541, 542, 292, 245

[56] References Cited

U.S. PATENT DOCUMENTS

| | | | |
|---|---|---|---|
| 1,274,575 | 8/1918 | Midgley | 310/209 |
| 1,565,252 | 12/1922 | Brisbois | 310/209 |
| 2,271,202 | 8/1939 | Rhein | 318/519 |
| 2,694,781 | 11/1954 | Hinz | 340/77 |
| 2,869,008 | 1/1959 | Carlsen | 340/209 |
| 3,001,099 | 9/1961 | Larkey | 310/68 R |
| 3,139,548 | 6/1964 | Krischker | 310/83 |
| 3,163,791 | 12/1964 | Carlson | 310/83 |
| 3,191,454 | 6/1965 | Holzer | 74/472 |
| 3,233,135 | 2/1966 | Holzer et al. | 310/209 |
| 3,247,400 | 4/1966 | Wolfner | 310/191 |
| 3,530,321 | 9/1970 | Reitherman | 340/75 |
| 3,534,203 | 10/1970 | Sommeria | 310/46 |
| 3,575,650 | 4/1971 | Fengler | 318/135 |
| 4,020,374 | 4/1977 | Mailfert et al. | 310/80 |
| 4,286,181 | 8/1981 | Guzman et al. | 310/191 |
| 4,570,254 | 2/1986 | Agostini | 310/191 |
| 4,607,197 | 8/1986 | Conrad | 318/135 |

OTHER PUBLICATIONS

DC Motors, Speed Controls, Servo Systems. Electro-- Craft Corporation, 5th Edition, 1980. Section on the DAARC Motor, pp. 2-68 thru 2-70.

Makino et al., "New Power Supply System for Air Conditioner Using Bidirectional Current Controled Convertor," electrical Engineering Institute Applied Technical Industries, Aug. 1989, No. 98, pp. 457-462.

Ando et al., "Voltage Follow Type Inverter Having Better Output Waveforms," Japanese Electrical Engineering 1989, Apr. 1989, No. 513, pp. 5-62.

Primary Examiner—Steven L. Stephan
Assistant Examiner—C. LaBalle
Attorney, Agent, or Firm—Philip M. Dunson

[57] ABSTRACT

Apparatus for providing selectively from time to time in the same member 11 either rotary motion 12 about an axis 13 or linear movement 14 in an axial direction from one position to another comprises: an electric motor 15 including a stator 16 comprising a housing 17 and a magnet 18 for providing a first magnetic field therein; a rotor 19 comprising an armature 20, for providing a second magnetic field, on a shaft 11; all of the above being coaxial about the axis 13; and a commutator 21 (mechanical or electronic) and associated circuitry 22 for conducting electrical energy to the motor 15 to provide, selectively, rotation 12 of the shaft 11 in a selected direction (clockwise or counterclockwise) and-/or axial translation 14 of the shaft 11 in a selected direction (toward or away from the first magnetic field). For rotation, the magnetic fields are substantially perpendicular; for translation, they are substantially parallel.

35 Claims, 5 Drawing Sheets

DUAL-MOTION APPARATUS

FIELD

This invention relates to apparatus for providing selectively from time to time in the same member either rotary motion about an axis or linear movement in an axial direction from one position to another. It has to do especially with a novel type of actuation device that combines the rotational motion of a motor with the linear stroke motion of a solenoid. A typical device according to the present invention may be employed to replace two separate actuators with a single compact unit.

Such a device can be useful in various applications. It can be designed to serve, for example, as a combined starter motor and solenoid in an automobile engine, as a combined window motor and lock actuator in the door of an automobile or other vehicle, as a combined motor for a power seat in an automobile, and as a dual-motion driving component in a hand power tool.

Typical apparatus according to the invention comprises an electric motor including a stator comprising a housing and a magnet for providing a first magnetic field therein; a rotor comprising an armature, for providing a second magnetic field, on a shaft; all of the above being coaxial about the axis; and a commutator (mechanical or electronic) and associated circuitry for conducting electrical energy to the motor to provide, selectively, rotation of the shaft in a selected direction (clockwise or counterclockwise) and/or axial translation of the shaft in a selected direction (toward or away from the first magnetic field). For rotation, the magnetic fields are substantially perpendicular; for translation, they are substantially parallel.

BACKGROUND

In a conventional direct current motor, the commutating brushes are oriented around the shaft so that optimum torque is achieved when power is applied to the motor. Generally speaking, this means that the magnetic field established by the armature winding has a direction that is transverse to the permanent magnet field (or field established by the stator field windings). Since the tendency is for the two fields to orient themselves in the same direction, a rotational torque is generated and the motor spins. Because input power is commutated to the next set of windings as the armature rotates, rotational torque is maintained.

In typical embodiments of the present invention, a second set of brushes is added to the commutator that are oriented perpendicular to the motor's original brushes. When power is applied to the second set of brushes, a magnetic field is generated in the armature that is parallel to the stator field, and no rotational torque is established. Depending on the polarity of input power, the two magnetic fields can be oriented with or against each other. In the first case, the magnetic system is extremely stable, and the rotor is strongly attracted to the stator field and held in its position. In the second case, the magnetic state is unstable, and the result is a repulsion force where the armature is pushed out from the permanent magnet field. Hence, with the armature initially displaced slightly in an axial direction from the center of the permanent magnet field, the application of direct current power to the second set of brushes can produce a predictable axial motion in the armature.

In other typical embodiments, a single set of brushes are employed to produce a magnetic field in the rotor that has components perpendicular and parallel to the stator field. In this device, applying electrical energy to the brushes produces rotary motion and axial translation simultaneously. Such a device is useful in applications where the two motions are well-defined and fixed, such as in starter motors for internal combustion engines.

Other typical embodiments of the invention include brushless motors, where the commutation function is performed electronically. In these devices, the rotor typically houses permanent magnets spaced about the shaft, and a set of sensors detects the position of the rotor. By knowing the position of the rotor and the magnetic field structure associated with the rotor, the electronic commutating circuitry can be controlled in such a way as to produce stator magnetic fields that have components perpendicular and parallel to the rotor field. The result is a device comprising a single element that can be rotated and translated.

Motors having an inherent magnetic attraction between the rotor and stator (due to the permanent magnets and ferromagnetic components) have the added feature of an inherently stable axial position. In such devices electrical energy may be applied with a polarity that causes repulsion of the armature away from a first position within the stator field to a second position partly outside the stator field. However, if no other latching mechanism is used, the armature will automatically return to its original position when the electrical energy is removed. By incorporating an auxiliary permanent magnet that holds the armature in its second position, it is possible to establish two stable axial positions for the armature. Therefore, the linear actuation can latch in two positions, and the armature can be rotated in either position without requiring that power be applied to translation brushes at the same time.

The principles of this invention can also be applied to a variety of direct current permanent magnet motors having ironless core rotors. In such devices, the rotor typically consists of epoxy-bonded windings in a well-defined shape and includes little or no ferromagnetic material. Hence, little or no inherent magnetic attraction exists between the armature and the stator field. This feature may also offer some advantages in certain applications.

Devices according to the present invention can be used as dual-motion actuators. They may incorporate clutches between two different rotary actuations. For example, when the armature is in one position, it may drive a high-torque worm gear assembly. When it is shifted axially, the clutch disengages the worm gear and engages, for example, a high speed rack and pinion assembly. Thus, a single motor can be used to perform two very different motions.

One type of application for this invention is the use of a single, multipurpose motor to perform both the window winding and the door locking functions in an automobile. The motor assembly can be cost-competitive with conventional mechanical mechanisms so that it can be incorporated into low and medium priced cars as standard equipment. The cost of the multipurpose door motor assembly can be less than the cost of the multiple, single-function actuators currently used on higher priced cars to perform the window actuation and door locking functions. Additional cost savings may be achieved by reducing the complexity of the electrical and mechanical parts. Integrating two actuators into one housing and reducing the routing requirements of the wiring harness facilitates installation and reduces assembly costs.

DISCLOSURE

Typical apparatus according to the present invention for providing selectively from time to time in the same member either rotary motion about an axis or linear movement in an axial direction from one predetermined position to another predetermined position, comprises electric motor means including stator means comprising housing means and means for providing a first magnetic field within the housing means; rotor means comprising armature means, for providing a second magnetic field within the housing means, on shaft means in the housing means; all of said means being coaxial; and commutating means and associated circuit means for conducting electrical energy to the motor means in such manner as to provide rotation of the shaft means in a predetermined direction and to provide axial movement of the shaft means in a predetermined direction.

Typically the circuit means comprises first connecting means for providing a magnetic field in the rotor means substantially perpendicular to the magnetic field of the stator means, second connecting means for providing a magnetic field in the rotor means substantially parallel to the magnetic field of the stator means, and switching means for connecting the circuit means to a source of electrical energy from time to time selectively either to the first connecting means or to the second connecting means. The switching means may comprise also selective means for connecting electrical energy to both the first and the second connecting means simultaneously.

In some typical embodiments of the invention, the magnetic field provided in the rotor means has a polarity such as to repel the rotor means from a first position substantially within the magnetic field of the stator means to a second position partly outside of the magnetic field of the stator means, and the first position of the rotor means is spaced axially away from the position that would be centered within the magnetic field of the stator means and in the direction toward the second position. In other typical embodiments, the magnetic field provided in the rotor means has a polarity such as to pull the rotor means from a first position partly outside of the magnetic field of the stator means to a second position substantially within the magnetic field of the stator means.

The commutating means typically comprises substantially conventional electrically conductive commutating means on the shaft means, and the first connecting means typically comprises a first pair of brushes contacting the commutating means in the normal positions thereon for providing rotation in the motor, while the second connecting means typically comprises a second pair of brushes contacting the commutating means in positions that are substantially spaced apart from the normal positions therein for providing rotation in the motor, so as to provide axial movement of the rotor means. Typically the second pair of brushes contact the commutating means in positions that are substantially ninety electrical degrees away from the normal positions therein for providing rotation in the motor.

In typical embodiments, the conducting means may comprise connecting means for providing a magnetic field in the rotor means having a component substantially perpendicular to the magnetic field of the stator means and a component substantially parallel to the magnetic field of the stator means, in which case the commutating means typically comprises substantially conventional electrically conductive commutating means on the shaft means, and the connecting means comprises brushes contacting the commutating means. Such apparatus may comprise also means for moving the brushes circumferentially on the commutating means to adjust the relative magnitudes of the substantially perpendicular component and the substantially parallel component of the magnetic field in the rotor means.

Typical stator means includes, at opposite ends of the housing means and coaxial therewith, bearing means for positioning the shaft means and for permitting axial movement, as well as rotation, of the shaft means therein. Typically the commutating means comprises substantially conventional electrically conductive commutating means on the shaft means, and the stator means comprises also brush means for conducting electrical energy to the commutating means, and elastic means for holding the brushes in electrical contact with the commutating means; and the commutating means has sufficient axial length to remain in electrical contact with the brush means in all axial positions of the rotor means.

Alternatively, the commutating means may comprise substantially conventional electrically conductive commutating means on the shaft means, in which case the motor means comprises also brush means for conducting electrical energy to the commutating means, and coaxial means between the housing means and the rotor means for holding the brushes elastically in electrical contact with the commutating means; the brush holding means being so positioned around the commutating means and a portion of the shaft means adjacent to the commutating means as to permit rotation of the shaft means, and being constrained by means on the shaft means to remain in the same axial position on the shaft means; and the stator means comprises means for preventing rotation of the brush holding means while permitting axial movement of the brush holding means.

The means for providing the first magnetic field may comprise permanent magnet means, direct current electromagnetic means, or alternating current electromagnetic means. The armature means for providing the second magnetic field typically comprises direct current electromagnetic means.

Where the first magnetic field is provided by alternating current electromagnetic means, the armature means for providing the second magnetic field typically comprises alternating current electromagnetic means supplied at like frequency and at such phase as to provide a second magnetic field that is either in phase with or 180 degrees out of phase with the first magnetic field.

The conducting means typically comprises means for predetermining the direction of rotation of the shaft means by conducting the electrical energy to the motor means selectively either with one polarity or with the opposite polarity. It may also include means for predetermining the direction of translation of the shaft means.

In some typical embodiments of the invention, the commutating means comprises electronic commutating means for controlling the conduction of the electrical energy to the field winding means in a brushless motor in which the armature means comprises permanent magnet means. The circuit means comprises sensing means, responsive to the position of the rotor means, for controlling the electronic commutating means. Typically the circuit means comprises adjustable means for controlling the operation of the electronic commutating means to provide optimal rotation of the motor means in a predetermined direction and at selected speeds, and switching means for controlling the operation of the electronic commutating means to provide axial movement of the shaft means in a selected direction.

Where the conducting means comprises connecting means for providing a magnetic field in the stator means having a component substantially perpendicular to the magnetic field of the rotor means and a component substantially parallel to the magnetic field of the rotor means, the commutating means typically comprises electronic commutating means for controlling the conduction of the electrical energy to the field winding means, and the circuit means typically comprises sensing means, responsive to the position of the armature means, for controlling the electronic commutating means. The circuit means may comprise also means for controlling the electronic commutating means to adjust the relative magnitudes of the substantially perpendicular component and the substantially parallel component of the magnetic field in the rotor means. The last-mentioned controlling means typically comprises means for adjusting an electric potential in the electronic commutating means between a first potential that provides only rotation of the shaft means and a second potential that provides only axial movement of the shaft means, or it may comprise means for switching directly from the first potential to the second and vice versa.

DRAWINGS

CARRYING OUT THE INVENTION

Figure 7:
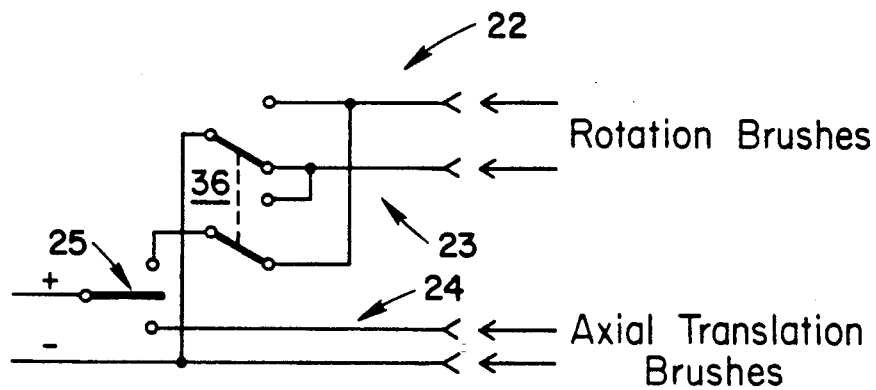
FIG. 7 is a schematic diagram showing typical circuitry for supplying direct current to, and controlling the operation of, apparatus as in FIG. 2. The same circuitry can be used with an alternating current supply.

Referring now to FIGS. 1-5, typical apparatus according to the present invention for providing selectively from time to time in the same member 11 either rotary motion 12 about an axis 13 or linear movement 14 in an axial direction from one predetermined position (as in FIG. 2) to another predetermined position (as in FIG. 3), comprises an electric motor 15 including a stator 16 comprising a housing 17 and a magnet 18 for providing a first magnetic field within the housing 17; a rotor 19 comprising an armature 20, for providing a second magnetic field within the housing 17, on a shaft 11 in the housing 17; all of the components 15-20 being coaxial about the axis 13; and a commutator 21 and associated circuitry 22 (see also FIGS. 7 and 8) for conducting electrical energy to the motor 15 in such manner as to provide rotation 12 of the shaft 11 in a predetermined direction (clockwise or counterclockwise) and to provide axial movement 14 of the shaft 11 in a predetermined direction (toward or away from the first magnetic field, selectively).

Typically the circuitry 22 comprises first connectors 23 for providing a magnetic field in the rotor 19 substantially perpendicular to the magnetic field of the stator 16, second connectors 24 for providing a magnetic field in the rotor 19 substantially parallel to the magnetic field of the stator 16, and a switch 25 (FIG. 7) for connecting the circuit to a source of electrical energy from time to time selectively either to the first connectors 23 or to the second connectors 24. The switch 25 may comprise also switches 35d, 35b for connecting electrical energy to both the first and the second connectors 23, 24 simultaneously (as in FIG. 8).

In some typical embodiments of the invention, the magnetic field provided in the rotor 19 has a polarity such as to repel the rotor 19 from a first position (rightmost, as in FIG. 2) substantially within the magnetic field of the stator 16 to a second position (leftmost, as in FIG. 3) partly outside of the magnetic field of the stator 16, and the first position of the rotor is spaced axially away from the position that would be centered within the magnetic field of the stator 16 and in the direction (to the left in FIG. 2) toward the second position. In other typical embodiments, the magnetic field provided in the rotor 19 has a polarity such as to pull the rotor 19 from a first position (leftmost, as in FIG. 3) partly outside of the magnetic field of the stator 16 to a second position (rightmost, as in FIG. 2) substantially within the magnetic field of the stator 16.

The commutator 21 typically comprises a substantially conventional electrically conductive commutator 21 on the shaft 11, and the first connectors 23 typically comprise a first pair of brushes 26 contacting the commutator 21 in the normal positions thereon for providing rotation in the motor 15, while the second connectors 24 typically comprise a second pair of brushes 27 contacting the commutator 21 in positions that are substantially spaced apart from the normal positions therein for providing rotation in the motor 15, so as to provide axial movement of the rotor 19. Typically the second pair of brushes 27 contact the commutator 21 in positions that are substantially ninety electrical degrees away from the normal positions therein for providing rotation in the motor.

In typical embodiments, the conductors 21, 22 may comprise connectors for providing a magnetic field in the rotor 19 having a component substantially perpendicular to the magnetic field of the stator 16 and a component substantially parallel to the magnetic field of the stator 16, in which case the commutator 21 typically comprises a substantially conventional electrically conductive commutator 21 on the shaft 11, and the connectors 23, 24 comprise a pair of brushes (26 or 27, but not both pairs) contacting the commutator 21 and typically positioned between the positions mentioned above and shown in FIG. 4. Such apparatus may comprise also an adjustable positioner for moving the brushes 26 or 27 circumferentially on the commutator 21 to adjust the relative magnitudes of the substantially perpendicular component and the substantially parallel component of the magnetic field in the rotor 19.

A typical stator 16 includes, at opposite ends of the housing 17 and coaxial therewith, bearings 28 (in end caps 29) for positioning the shaft 11 and for permitting axial movement, as well as rotation, of the shaft 11 therein. Typically the commutator 21 comprises a substantially conventional electrically conductive commutator 21 on the shaft 11, and the stator 16 comprises also brushes 26, 27 for conducting electrical energy to the commutator 21, and elastic positioners 30, such as springs, for holding the brushes 26, 27 in electrical contact with the commutator 21; and the commutator 21 has sufficient axial length to remain in electrical contact with the brushes 26, 27 in all axial positions of the rotor 19.

Figure 1:
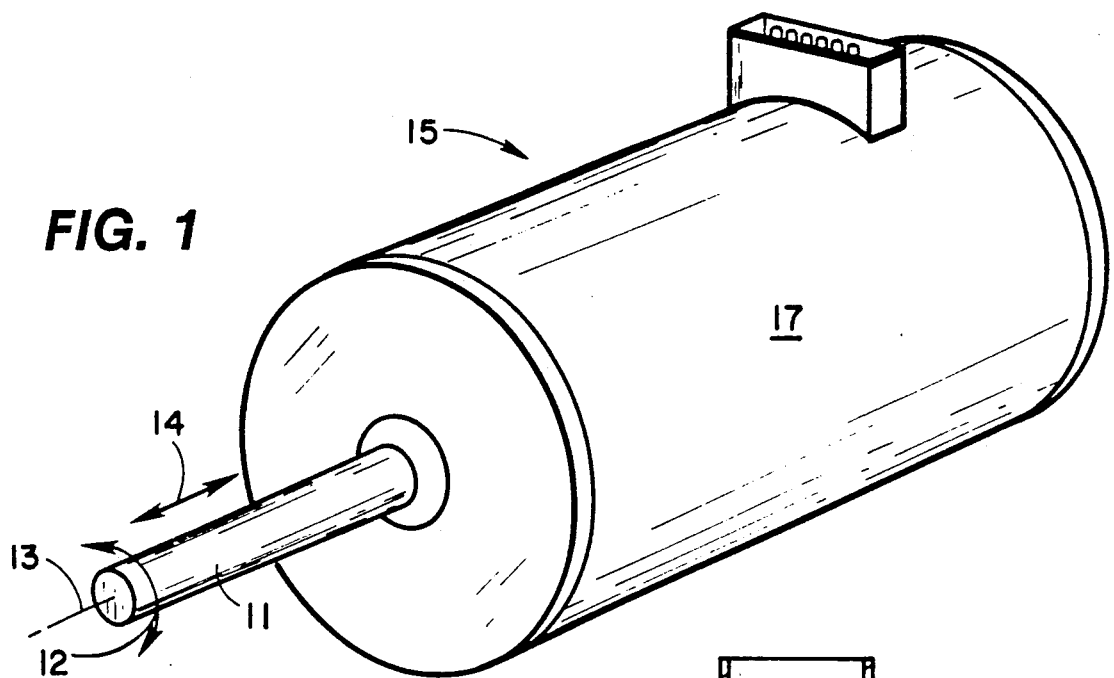
FIG. 1 is a simplified perspective view showing the exterior of typical apparatus according to the present invention.
Figure 4:
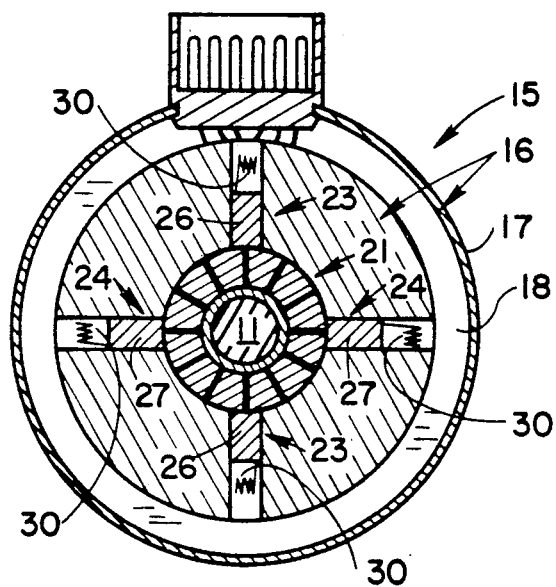
FIG. 4 is an end sectional view taken on the plane 4—4 in FIG. 2.
Figure 5:
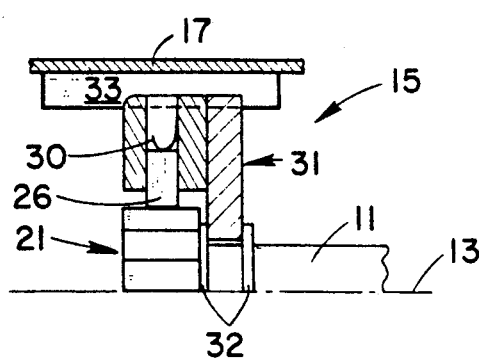
FIG. 5 is a side view, partly in section, showing a typical modification of a part of the apparatus shown in FIG. 2 and FIG. 4.
Figure 6:
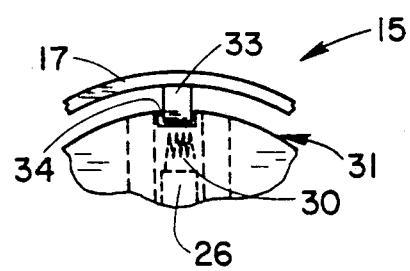
FIG. 6 is an end view of the upper part of the apparatus shown in FIG. 5.

Alternatively (as shown in FIGS. 5 and 6), the commutator 21 may comprise a substantially conventional electrically conductive commutator 21 on the shaft 11, in which case the motor 15 comprises also substantially conventional brushes 26, 27 for conducting electrical energy to the commutator 21, and a coaxial mounting (such as the brush holding coaxial structure 31) between the housing 17 and the rotor 19 for holding the brushes elastically (by the springs 30) in electrical contact with the commutator 21; the brush holding structure 31 being so positioned around the commutator 21 and a portion of the shaft 11 adjacent to the commutator 21 as to permit rotation of the shaft 11, and being constrained by radially extending guide rings 32 on the shaft 11 to remain in the same axial position on the shaft 11; and the stator a motion limiting structure 16 comprises (such as a straight guiding member 33 protruding into a slot 34 in the brush holding structure 31) for preventing rotation of the brush holding structure 31 while permitting axial movement of the brush holding structure 31.

Figure 2:
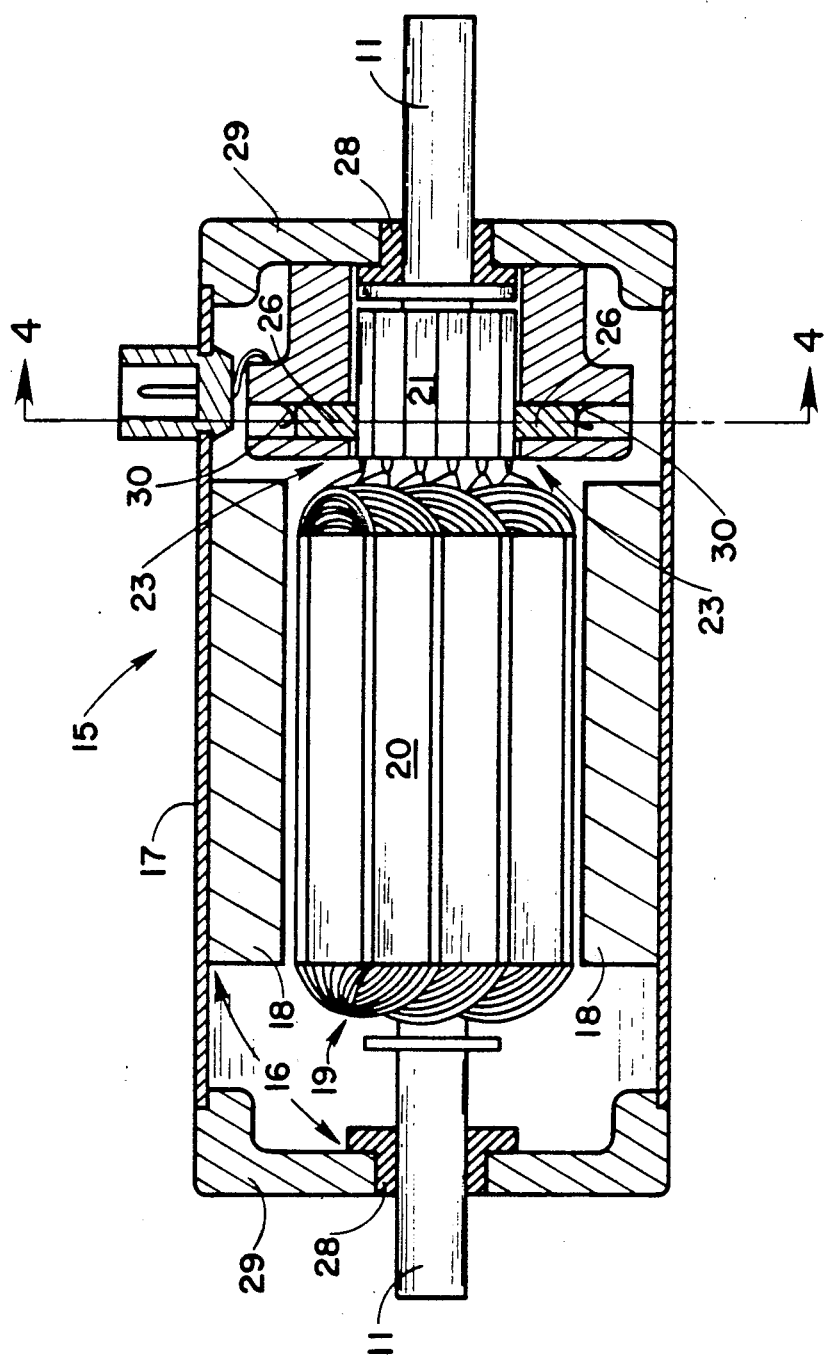
FIG. 2 is a simplified side view of typical apparatus as in FIG. 1 wherein the housing and other components of the stator are shown in section and the rotor is shown in its rightmost position.
Figure 3:
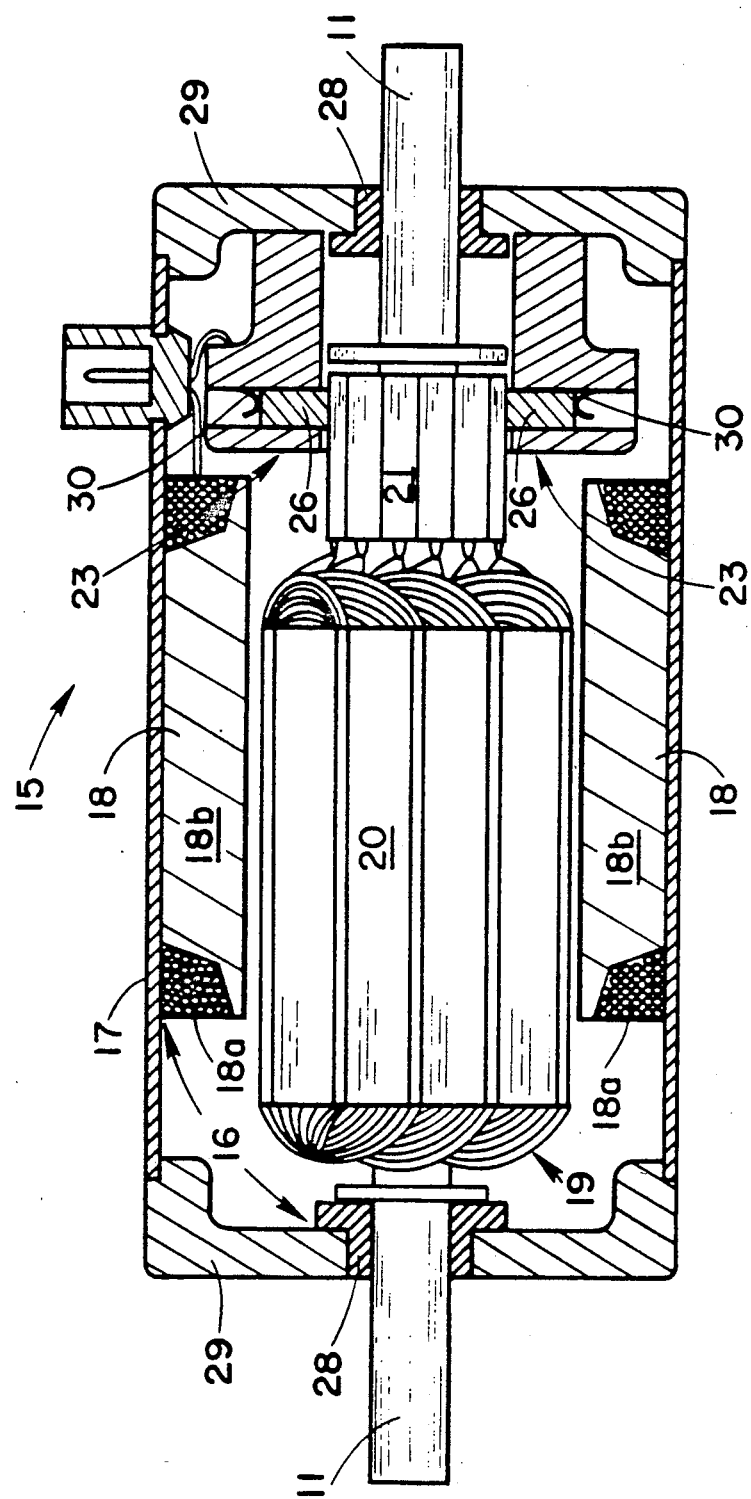
FIG. 3 is a view similar to FIG. 2 of another typical embodiment of the invention, and showing the rotor in its leftmost position.
Figure 8:
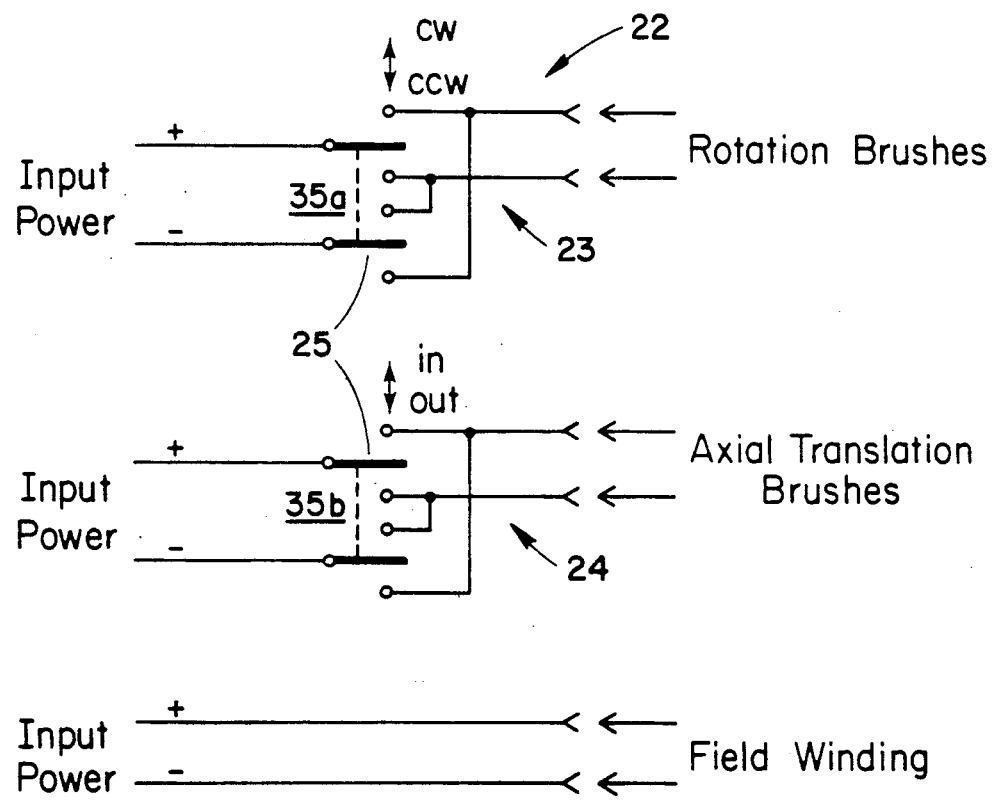
FIG. 8 is a schematic diagram showing typical circuitry for supplying direct current to, and controlling the operation of, apparatus as shown in FIG. 3. The same circuitry can be used with alternating current supplies.

The magnet for providing the first magnetic field may comprise a permanent magnet 18, as in FIG. 2; or it may comprise a direct current electromagnet or an alternating current electromagnet, while typically includes field windings 18a wrapped around pole pieces 18b, as in FIG. 3. Electrical energy is supplied to the field windings 18a through conductors 22, as shown in FIG. 8. The armature 20 for providing the second magnetic field typically comprises a direct current electromagnet 20, as shown in FIG. 2.

Where the first magnetic field is provided by an alternating current electromagnet 18 as in FIG. 3, the armature for providing the second magnetic field typically comprises an alternating current electromagnet 20 supplied at like frequency (as in FIG. 8, using alternating current supplies) and at such phase as to provide a second magnetic field that is either in phase with or 180 degrees out of phase with the first magnetic field.

The conductors 22 typically comprise a switch (such as the double-pole, three-position, switch 35a in FIG. 8; or the double-pole, double-throw, switch 36 in FIG. 7) for predetermining the direction of rotation of the shaft 11 by conducting the electrical energy to the motor selectively either with one polarity or with the opposite polarity. They may also include a switch (such as the double-pole, three-position, switch 35b in FIG. 8) for predetermining the direction of translation of the shaft 11.

Figure 9:
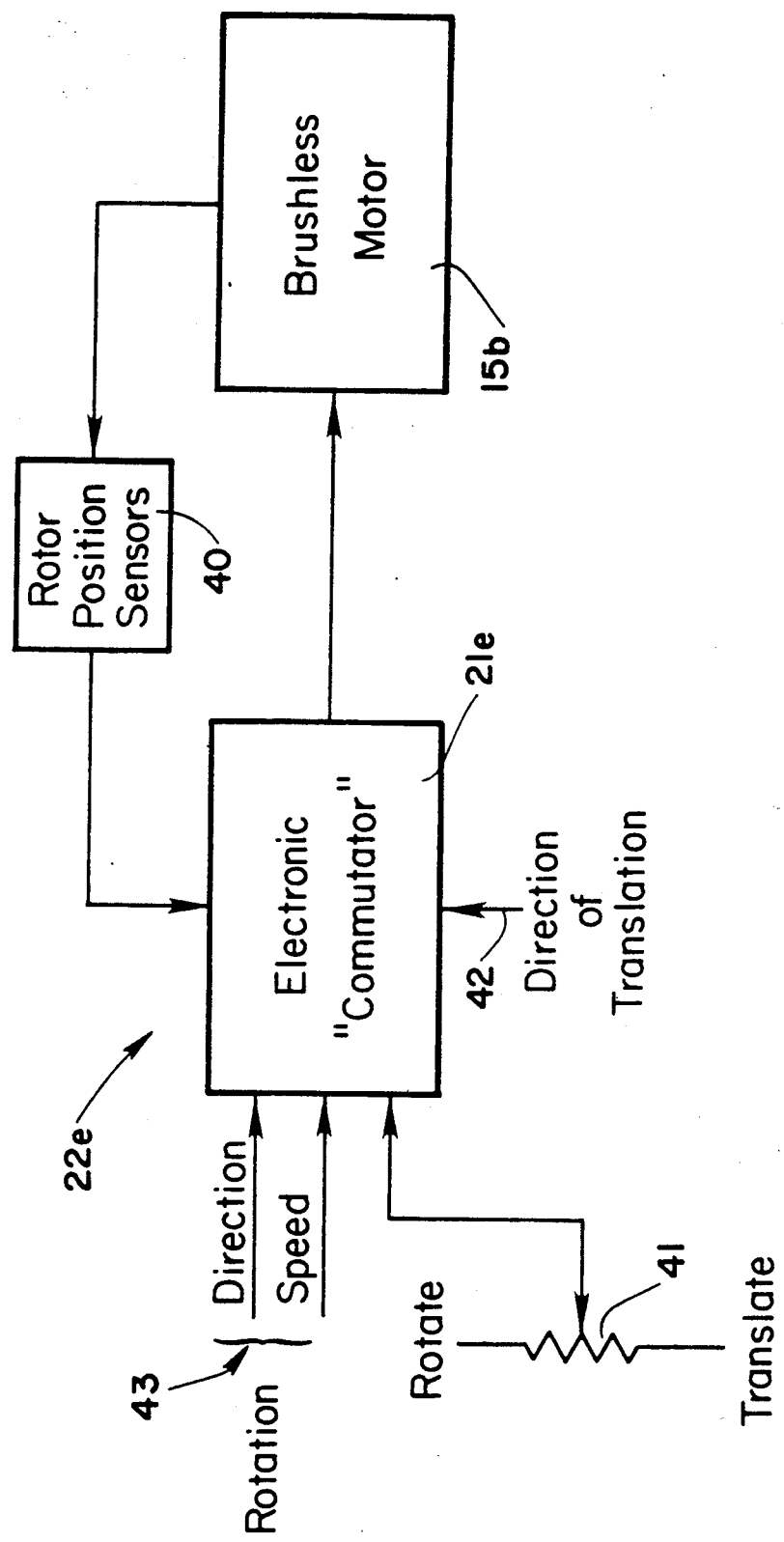
FIG. 9 is a schematic block diagram of typical electronic commutating means and associated circuitry that may be used in the present invention instead of the conventional type of commutating means shown in FIGS. 2-6.

In some typical embodiments of the invention, as illustrated in FIG. 9, the commutator 21 comprises an electronic commutator 21e for controlling the conduction of the electrical energy to the field winding 18a in the brushless motor 15b conventionally having no commutator on the shaft means 11 and having an armature 20 comprising a permanent magnet. The circuitry 22e comprises sensors 40, responsive to the position of the rotor 20 in the brushless motor 15b, for controlling the electronic commutator 21e. Typically the circuitry 22e comprises adjustable controls 43 for controlling the operation of the electronic commutator 21e to provide optimal rotation of the brushless motor 15b in a predetermined direction and at selected speeds, and a switch 43 for controlling the operation of the electronic commutator 21e to provide axial movement of the shaft 11 in a selected direction.

In apparatus having electronic control as in FIG. 9, where the conductors 21, 22 comprise connectors for providing a magnetic field in the stator 16 having a component substantially perpendicular to the magnetic field of the rotor 19 and a component substantially parallel to the magnetic field of the rotor 19, the commutator 21 typically comprises an electronic commutator 21e for controlling the conduction of the electrical energy to the field winding 18a, and the circuitry 22e typically comprises sensors 40, responsive to the position of the rotor 19 in the brushless motor 15b, for controlling the electronic commutator 21e. The circuitry 22e may comprise also an adjustable voltage or current control 41 for controlling the electronic commutator 21e to adjust the relative magnitudes of the substantially perpendicular component and the substantially parallel component of the magnetic field in the stator 16. The last-mentioned controller typically comprises a potentiometer 41 for adjusting an electric potential in the electronic commutator 21e between a potential that provides only rotation of the shaft 11 and a potential that provides only axial movement of the shaft 11. The controller 41 may also comprise a switch for providing an electrical potential in the electronic commutator 21e that provides only rotation of the shaft 11 or a potential that provides only axial movement of the shaft 11.

In apparatus as shown in FIG. 9, the brushless motor 15b may, except for its additional capability for axial translation, be similar to a conventional brushless motor; the rotor position sensors 40 may be similar to convention sensors used in circuitry for controlling brushless motors; and the electronic commutator 21e, except for the additional circuitry 41, 42, etc. that is provided to control the axial movement of the shaft 11, may be similar to known apparatus for controlling brushless motors. More specifically, typical apparatus as in FIG. 9 may comprise conventional devices and circuitry for providing control of a three-phase brushless motor 15b according to the following truth table.

THREE PHASE, SIX STEP COMMUTATION TRUTH TABLE

| Rotor Position | Rotate/ Translate | Direction of Rotation CW/CCW | Direction of Translation In/Out* | Rotor Position Sensors | | | Outputs to Motor Windings | | |
|---|---|---|---|---|---|---|---|---|---|
| | | | | A | B | C | X | Y | Z |
| 1 | 1 | 1 | X | 1 | 0 | 1 | 1 | 0 | — |
| 2 | 1 | 1 | X | 1 | 0 | 0 | 1 | — | 0 |
| 3 | 1 | 1 | X | 1 | 1 | 0 | — | 1 | 0 |
| 4 | 1 | 1 | X | 0 | 1 | 0 | 0 | 1 | — |
| 5 | 1 | 1 | X | 0 | 1 | 1 | 0 | — | 1 |
| 6 | 1 | 1 | X | 0 | 0 | 1 | — | 0 | 1 |
| 1 | 1 | 0 | X | 1 | 0 | 1 | 0 | 1 | — |
| 2 | 1 | 0 | X | 1 | 0 | 0 | 0 | — | 1 |
| 3 | 1 | 0 | X | 1 | 1 | 0 | — | 0 | 1 |
| 4 | 1 | 0 | X | 0 | 1 | 0 | 1 | 0 | — |
| 5 | 1 | 0 | X | 0 | 1 | 1 | 1 | — | 0 |
| 6 | 1 | 0 | X | 0 | 0 | 1 | — | 1 | 0 |
| 1 | 0 | X | 1 | 1 | 0 | 1 | 0 | 0 | 1 |
| 2 | 0 | X | 1 | 1 | 0 | 0 | 1 | 0 | 1 |
| 3 | 0 | X | 1 | 1 | 1 | 0 | 1 | 0 | 0 |
| 4 | 0 | X | 1 | 0 | 1 | 0 | 1 | 1 | 0 |
| 5 | 0 | X | 1 | 0 | 1 | 1 | 0 | 1 | 0 |
| 6 | 0 | X | 1 | 0 | 0 | 1 | 0 | 1 | 1 |
| 1 | 0 | X | 0 | 1 | 0 | 1 | 1 | 1 | 0 |
| 2 | 0 | X | 0 | 1 | 0 | 0 | 0 | 1 | 0 |
| 3 | 0 | X | 0 | 1 | 1 | 0 | 0 | 1 | 1 |
| 4 | 0 | X | 0 | 0 | 1 | 0 | 0 | 0 | 1 |
| 5 | 0 | X | 0 | 0 | 1 | 1 | 1 | 0 | 1 |
| 6 | 0 | X | 0 | 0 | 0 | 1 | 1 | 0 | 0 |

X = don't care
* = may be reversed
CW = clockwise
CCW = counterclockwise
1 = high signal
0 = low signal
— = open output Such apparatus may be much like the Brushless DC Motor Controller MC33034 described in the attached Appendix to this specification. The appendix comprises a copy of relevant parts of Data Sheet MC33034/D of Motorola Inc., Phoenix, Ariz., pages 1, 7-12, and 14-17, and is incorporated herein by reference.

I claim:

1. Apparatus for providing selectively from time to time in the same member either rotary motion about an axis or linear movement in an axial direction from one predetermined position to another predetermined position, comprising
   electric motor means including stator means comprising housing means and means or providing a first magnetic field within the housing means; rotor means comprising armature means for providing a second magnetic field within the housing means, on shaft means in the housing means; all of said means being coaxial; and
   commutating means and associated circuit means for conducting electrical energy to the motor means in such manner as to provide rotation of the shaft means in a predetermined direction and to provide axial movement of the shaft means in a predetermined direction;
   the circuit means comprising first connecting means for providing a magnetic field in the rotor means substantially perpendicular to the magnetic field of the stator means and second connecting means for providing a magnetic field in the rotor means substantially parallel to the magnetic field of the stator means.

2. Apparatus as in claim 1, comprising also switching means for connecting the circuit means to a source of electrical energy from time to time selectively either to the first connecting means or to the second connecting means.

3. Apparatus as in claim 2, wherein the switching means comprises also selective means for connecting electrical energy to both the first and the second connecting means simultaneously.

4. Apparatus as in claim 1, wherein the magnetic field provided in the rotor means has a polarity such as to repel the rotor means from a first position substantially within the magnetic field of the stator means to a second position partly outside of the magnetic field of the stator means.

5. Apparatus as in claim 4, wherein the first position of the rotor means is spaced axially away from the position that would be centered within the magnetic field of the stator means and in the direction toward the second position.

6. Apparatus as in claim 1, wherein the magnetic field provided in the rotor means has a polarity such as to pull the rotor means from a first position partly outside of the magnetic field of the stator means to a second position substantially within the magnetic field of the stator means.

7. Apparatus as in claim 1, wherein the commutating means comprises substantially conventional electrically conductive commutating means on the shaft means, and the first connecting means comprises a pair of brushes contacting the commutating means in the normal positions thereon for providing rotation in the motor.

8. Apparatus as in claim 1, wherein the commutating means comprises substantially conventional electrically conductive commutating means on the shaft means, and the second connecting means comprises a pair of brushes contacting the commutating means in positions that are substantially spaced apart from the normal positions therein for providing rotation in the motor, so as to provide axial movement of the rotor means.

9. Apparatus as in claim 8, wherein the brushes contact the commutating means in positions that are substantially ninety electrical degrees away from the normal positions therein for providing rotation in the motor.

10. Apparatus as in claim 1, wherein the conducting means comprises connecting means for providing a magnetic field in the rotor means having a component substantially perpendicular to the magnetic field of the stator means and a component substantially parallel to the magnetic field of the stator means.

11. Apparatus as in claim 10, wherein the commutating means comprises substantially conventional electrically conductive commutating means on the shaft means, and the connecting means comprises brushes contacting the commutating means.

12. Apparatus as in claim 11, comprising also means for moving the brushes circumferentially on the commutating means to adjust the relative magnitudes of the substantially perpendicular component and the substantially parallel component of the magnetic field in the rotor means.

13. Apparatus as in claim 1, wherein the stator means includes, at opposite ends of the housing means and coaxial therewith, bearing means for positioning the shaft means and for permitting axial movement, as well as rotation, of the shaft means therein.

14. Apparatus as in claim 13, wherein the commutating means comprises substantially conventional electrically conductive commutating means on the shaft means, and wherein the stator means comprises also brush means for conducting electrical energy to the commutating means, and elastic means for holding the brushes in electrical contact with the commutating means; and wherein the commutating means has sufficient axial length to remain in electrical contact with the brush means in all axial positions of the rotor means.

15. Apparatus as in claim 13, wherein the commutating means comprises substantially conventional electrically conductive commutating means on the shaft means, and wherein the motor means comprises also brush means for conducting electrical energy to the commutating means, and coaxial means between the housing means and the rotor means for holding the brushes elastically in electrical contact with the commutating means;

said brush holding means being so positioned around the commutating means and a portion of the shaft means adjacent to the commutating means as to permit rotation of the shaft means, and being constrained by means on the shaft means to remain in the same axial position on the shaft means;

and wherein the stator means comprises means for preventing rotation of the brush holding means while permitting axial movement of the brush holding means.

16. Apparatus as in claim 1, wherein the means for providing the first magnetic field comprises permanent magnet means.

17. Apparatus as in claim 1, wherein the means for providing the first magnetic field comprises electromagnetic means.

18. Apparatus as in claim 17, wherein the electromagnetic means comprises direct current means.

19. Apparatus as in claim 17, wherein the electromagnetic means comprises alternating current means.

20. Apparatus as in claim 16, wherein the armature means for providing the second magnetic field comprises direct current electromagnetic means.

21. Apparatus as in claim 19, wherein the armature means for providing the second magnetic field comprises alternating current electromagnetic means supplied at like frequency and at such phase as to provide a second magnetic field that is either in phase with or 180 degrees out of phase with the first magnetic field.

22. Apparatus as in claim 1, wherein the conducting means comprises means for predetermining the direction of rotation of the shaft means by conducting the electrical energy to the motor means selectively either with one polarity or with the opposite polarity.

23. Apparatus as in claim 1, wherein the conducting means comprises means for predetermining the direction of translation of the shaft means by conducting the electrical energy to the motor means selectively either with one polarity or with the opposite polarity.

24. Apparatus for providing selectively from time to time in the same member either rotary motion about an axis or linear movement in an axial direction from one predetermined position to another predetermined position, comprising electric motor means including stator means comprising housing means and means for providing a first magnetic field within the housing means; rotor means comprising armature means for providing a second magnetic field within the housing means, on shaft means in the housing means; all of said means being coaxial; and commutating means and associated circuit means for conducting electrical energy to the motor means in such manner as to provide rotation of the shaft means in a predetermined direction and to provide axial movement of the shaft means in a predetermined direction;

wherein the commutating means comprises electronic commutating means, or controlling the conduction of the electrical energy to the stator means, comprising electromagnetic means for providing the first magnetic field so as to be substantially perpendicular to the second magnetic field provided by the rotor means.

25. Apparatus as in claim 24, wherein the commutating means comprises also electronic commutating means, for controlling the conduction of the electrical energy to the stator means, comprising electromagnetic means for providing the first magnetic field so as to be substantially parallel to the second magnetic field provided by the rotor means.

26. Apparatus as in claim 25, wherein the armature means comprises permanent magnet means for providing the second magnetic field.

27. Apparatus as in claim 25, wherein the circuit means comprises sensing means, responsive to the position of the rotor means for controlling the electronic commutating means.

28. Apparatus as in claim 24, wherein the circuit means comprises adjustable means for controlling the operation of the electronic commutating means to provide optimal rotation of the motor means in a predetermined direction and at selected speeds.

29. Apparatus as in claim 26, wherein the circuit means comprises adjustable means for controlling the operation of the electronic commutating means to provide axial movement of the shaft means in a selected direction.

30. Apparatus for providing selectively from time to time in the same member either rotary motion about an axis or linear movement in an axial direction from one predetermined position to another predetermined position, comprising electric motor means including stator means comprising housing means and means for providing a first magnetic field within the housing means; rotor means comprising armature means, for providing a second magnetic field within the housing means, on shaft means in the housing means; all of said means being coaxial; and commutating means and associated circuit means for conducting electrical energy to the motor means in such manner as to provide rotation of the shaft means in a predetermined direction and to provide axial movement of the shaft means in a predetermined direction;

wherein the commutating means comprises electronic commutating means, for controlling the conduction of the electrical energy to the stator means, comprising electromagnetic means for providing the first magnetic field so as to have a component substantially perpendicular to the second magnetic field provided by the rotor means and a component substantially parallel to the second magnetic field.

31. Apparatus as in claim 30, wherein the armature means comprises permanent magnet means for providing the second magnetic field.

32. Apparatus as in claim 30, wherein the circuit means comprises sensing means, responsive to the position of the rotor means, for controlling the electronic commutating means.

33. Apparatus as in claim 30, wherein the circuit means comprises means for controlling the electronic commutating means to adjust the relative magnitudes of the substantially perpendicular component and the substantially parallel component of the magnetic field in the stator means.

34. Apparatus as in claim 33, wherein the last-mentioned controlling means comprises means for adjusting an electric potential in the electronic commutating means between a potential that provides only rotation of the shaft means and a potential that provides only axial movement of the shaft means.

35. Apparatus as in claim 33, wherein the last-mentioned controlling means comprises means for switching an electric potential in the electronic commutating means from a potential that provides only rotation of the shaft means to a potential that provides only axial movement of the shaft means and vice versa.

* * * * *